March 6, 1962  M. WEBER  3,023,643
FRICTION ROLLER GEAR TRANSMISSION
Filed Dec. 6, 1957  8 Sheets-Sheet 1

Fig. 1

INVENTOR
MAX WEBER

BY Toulmin & Toulmin
ATTORNEYS

March 6, 1962 M. WEBER 3,023,643
FRICTION ROLLER GEAR TRANSMISSION
Filed Dec. 6, 1957 8 Sheets-Sheet 2

Fig. 1A

INVENTOR
MAX WEBER

BY Toulmin & Toulmin
ATTORNEYS

March 6, 1962 M. WEBER 3,023,643
FRICTION ROLLER GEAR TRANSMISSION
Filed Dec. 6, 1957 8 Sheets-Sheet 5

Fig. 8A

INVENTOR
MAX WEBER

BY *Toulmin & Toulmin*
ATTORNEYS

March 6, 1962 M. WEBER 3,023,643
FRICTION ROLLER GEAR TRANSMISSION
Filed Dec. 6, 1957

FIG.10.

INVENTOR:
Max Weber
By Otto John Munz
Attorney

3,023,643
FRICTION ROLLER GEAR TRANSMISSION
Max Weber, 16 Rauensteinstrasse,
Uberlingen (Bodensee), Germany
Filed Dec. 6, 1957, Ser. No. 701,216
Claims priority, application Germany Dec. 10, 1956
16 Claims. (Cl. 74—796)

The invention relates to a friction roller gear and more particularly to a roller arrangement in which individual rollers or pairs of rollers, which are arranged about a driving roller and a driven roller, transmit the driving force, these rollers being bevelled rollers.

It is the object of the present invention to provide friction roller gears having rotating friction rollers consisting of two cones of inverse slope of a frusto-conical shape with an adjacent driving head and adjacent to the truncated cone a driving ring, the arrangement being such as to maintain an intimate contact, irrespective of the load being altered by jerks and deformations occurring with the parts cooperating in the power transmission or power transmitting parts not being uniformly supported due to tolerances built into the assembly.

It is a further object of the invention to arrange the rows of bevelled rollers so that the load-dependent contact pressures are neutralized and the bearings themselves are not subject to a contact stress and are thus relieved from pressure.

According to the present invention, the above disadvantages are overcome by providing a uniform contact between the driving head and the curved wedging surfaces of the truncated cone through self-adjusting supporting surfaces.

According to the invention, any possible spacing or displacement of the angles relatively to the driving or supporting contact is avoided in such a manner that said angles are not corrected at the supporting surface or the contact or driving surface, but are transmitted e.g. through balls to joint-shaped parts and offset one another without any prejudicious influence on the contact pressure.

A possible embodiment consists in that the self-adjusting supporting surfaces of the so-called hump coupling adjacent to the truncated cone are formed by independently movable supporting discs jointly supported through balls on a supporting disc adjacent to a casing.

As to the existing supporting disc it will be suitable to move the supporting disc from the outside by means of a hand-wheel through a worm-gear in such a manner as to provide a variable supporting pressure of the supporting surfaces on the truncated cone.

In respect to the joint members a feature consists in that the balls carried in a cage transmit in a known manner between the humps of the supporting discs and dependent on the load, the contact on the wedging surface of the truncated cone, said balls, however, being also movable independent of the load relative to the curved surfaces from the outside through the cage.

The possibility of displacing the balls carried in the coupling from the outside enables the friction roller gear to be adjusted so that wider tolerances in the manufacture may be acceptable, any inaccuracy being eliminated by said adjustment from the outside.

One form of said adjustment consists in that a pin engages in a bore of the cage carrying the balls, said pin being actuated by a cam-gear displacing the cage in one or the other direction relatively to the curved surfaces.

For the operation of said adjustment the cam-gear or eccentric sheave may be connected with the casing through a spring and a pin so that the cage carrying the balls always occupies the same determined position relative to the curved surfaces in the rest position of the gear.

Instead of providing the movable surfaces on the side of the supporting disc, there is another possibility that the surface of the driving head adjacent to the wedging surface of the truncated cone comprises a fixed part and an axially spring-pressed adjusting part.

A preferred embodiment of the adjusting surfaces on the supporting side consists of cylindrical paths of the supporting discs that are formed as two friction paths running at a different level at the truncated cone, having therebetween a hollow space permitting of an independent adjustment.

In order to prevent any vibrations from occurring or being formed it is important that the follower ring be formed as a ring spring damping vibrations.

In respect to said form of the follower ring another possibility consists of forming the follower ring as a ring spring connected by pins with the slotted follower bell suitably made of light-metal alloy.

In an embodiment with double row gears it is of importance that with double row gears the surface of the other row of bevel rollers opposite to the coupling be flexible or formed e.g. as a rubber cushion.

In order to avoid load-dependent contacts forces or generally contact forces from acting on the bearings it is of importance that driving conical surfaces mutually wedging themselves are arranged on the driving axle, of which the driving conical surface on the follower side is axially movable by means of a load-dependent coupling of a known type, or otherwise is axially subject to an adjustable stress without a curved surface coupling by means of a diaphragm spring.

The advantage of said arrangement is that because of two rows of cones having a parallel running greater powers can be transmitted without any contact forces acting on the bearings. Another advantage of said arrangement may be seen in the fact that the manufacture of such gears requires but little accuracy, the parts being adjustable by means of an axial screw for the assembly and thus work at the optimum efficiency in respect to the load transmission.

In this connection it is of importance that the roller axles in the radial play of wedging have a lateral play without any additional jamming of the bearings.

With respect to the running of the bevel rollers in which every idle friction should be avoided, it is of importance that the bevel rollers arranged in pairs and in steps are adjusted in such a manner that the enveloping tangents of the conical surfaces of supporting rings intersect on the center line of the two inclined cone axes outside the center line of the driving shaft, while the driving cone envelopes meet at a distance on the center line of the driving shaft.

The adjustment of such bearings should also be simplified. A preferred embodiment consists in that a diaphragm spring by means of a counter-nut imparts an initial tension to the load-dependent coupling, while the roller bearer is adjustable from the counter-nut through the bearing in relation to the play between the rows of bevel rollers.

Such bearings may simply be adjusted on the test-stand by measuring the amount of dead travel and turning the respective counter-nuts in order to determine when the amount of dead travel is at a minimum. The bearing now has an optimum adjustment and a correct play and herefrom it follows that multiple row bevel roller gears are easily manufactured and adjusted.

With respect to the adjustment of the speed it is of importance that an adjusting cylinder rotatably movable through the bevel wheel has oppositely arranged inclined slots in order to move the pivots at the radially sprung supporting ring against one another or to separate them in a slot.

It will be sufficient to provide a single hand-wheel on the casing in order to move an adjusting cylinder and thus to provide an infinitely variable speed.

The accompanying drawings show embodiments of the invention and further features of the invention will be seen from the drawings and the following specification.

Figure 1:
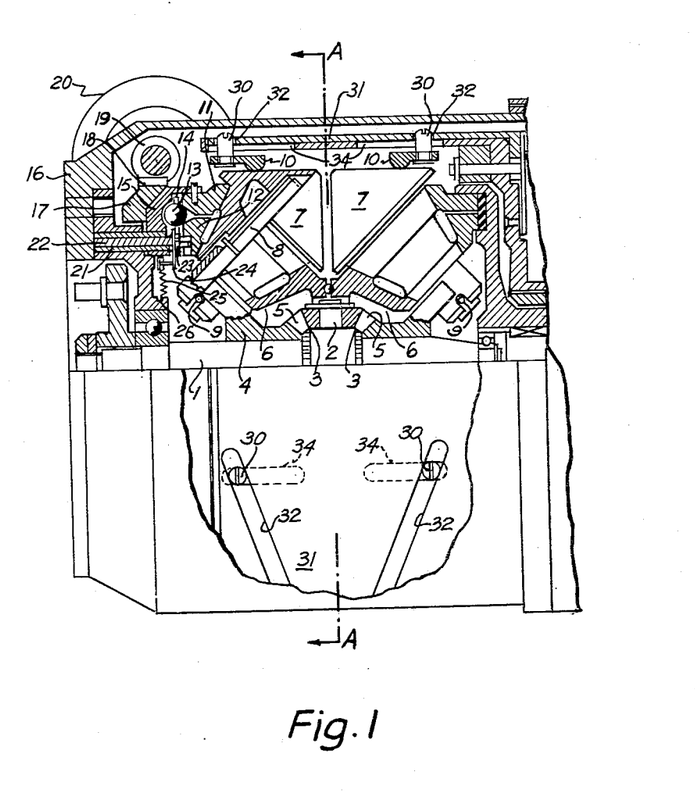
FIG. 1 shows in front elevation a double row friction roller gear, the upper part being a sectional view and the bottom part being but a partial section of the casing in order to show the speed control.
Figure 1A:
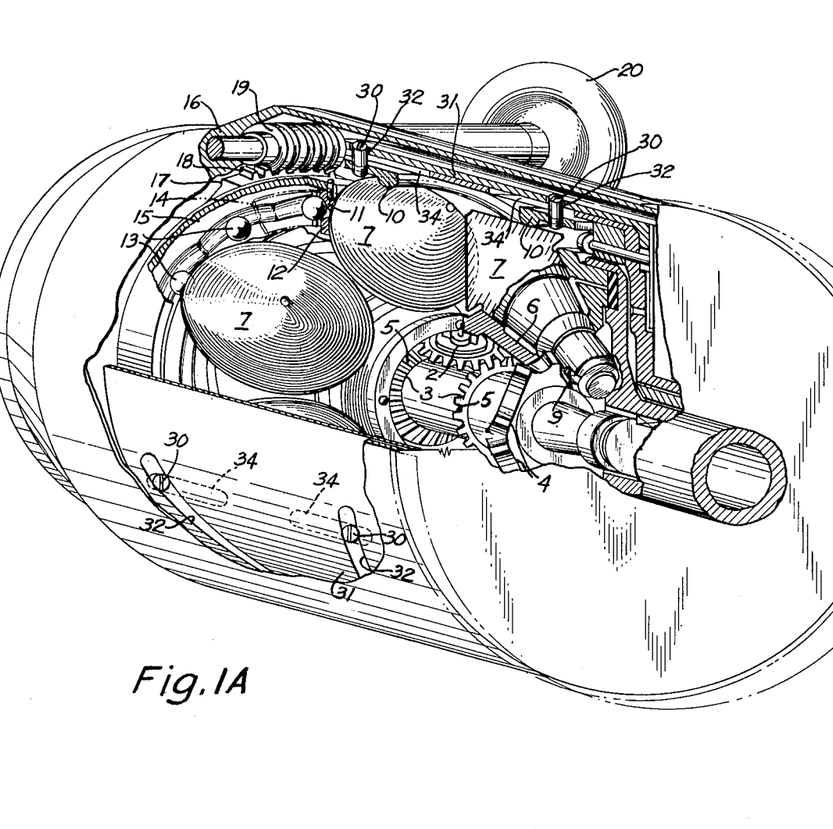
FIG. 1A is an assembly isometric view of the double row friction roller gear illustrated in FIG. 1 with several components of the transmission being removed to clarify the relationship between the cones and the supporting surfaces bearing against the cones.

Referring now to the drawings, the two friction rollers 7 in the embodiment of FIG. 1 are driven through a differential comprising pinions 2 having teeth 3 which mesh with teeth 5 of sleeves 4 which are carried on the shaft 1 for free rotation relative thereto. The friction roller axles 8 are longitudinally movable with the play X at the shown longitudinal slot, but are secured against rotation in the direction of rotation by means of a pin 9. The friction rollers 7 are wedged in between the driving rings 6, the two follower rings 10 and the two axially movable supporting discs 11, 12. The power transmission from the two supporting discs 11, 12, takes place through the balls 13, that are carried in a ball ring 14. The balls adjacent on one side to the surfaces of the supporting discs 11, 12, are adjacent on the other side to another supporting disc 15, the latter bearing on the casing 16 by a suitable axial thread (not shown). The supporting disc 15 may be rotated by means of a setting nut 17 having formed thereon a worm wheel 18 which may be rotated through the worm shaft 19 outside by the hand-wheel 20.

The ball ring 14 is also adjustable, a hollow pin 21 being provided. In said pin an axle 22 is rotatably supported, which axle has an eccentric pin 23 on one end thereof engaging in a radial slot of the ball ring 14. When the axle is rocked in one or the other direction, the ball ring 14 is also rotated in one or the other sense, according to the distance of the eccentric pin 23 from the rotating shaft.

The zero position of said eccentric pin will be attained in such a manner that the eccentric lever 24 has fixed to it a spiral spring 25 connected at 26 to the casing which spring acts continuously to urge the lever 24 downwardly into a predetermined position.

Figures 2, 3, 4, 5, 7:
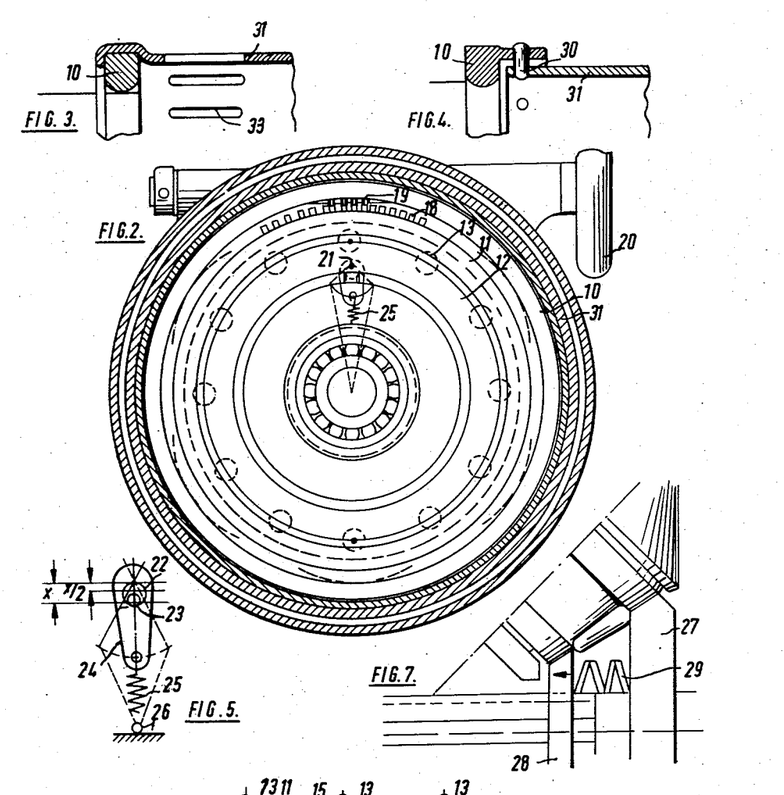
FIG. 2 is a side elevation of the FIG. 1 seen in the direction A—A of the FIG. 1, the view to the supporting rings being shown with removed friction rollers.
FIG. 3 shows a detail of the follower ring.
FIG. 4 shows another follower ring.
FIG. 5 schematically shows a form of the automatic adjustment to zero by an eccentric.
FIG. 7 shows a form of an automatic adjustment on the side of the driving head.
Figure 6:
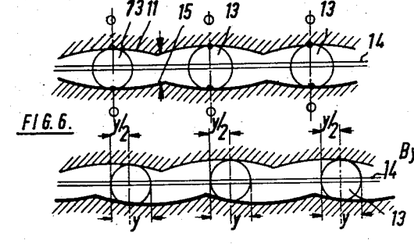
FIG. 6 schematically illustrates the effect of the adjustment to zero of the FIG. 5.

More particularly from FIG. 5 and comparing it with FIG. 6, it will be seen that e.g. in the upper part of FIG. 6 the balls occupy their zero position, i.e. the coupling occupies its central position, while in the lower part of FIG. 6 an initial tension is obtained by displacing the ball ring. Said displacement from the zero position is marked with Y/2 in FIG. 6.

Taking the present gear tranmission as a single row gear transmission, it will be seen that the power transmission and the wedging respectively of the friction rollers 7 is accomplished by the surfaces 6, 11, and 12 and the frusto-conical part opposite to the follower ring 10. With an increasing load said surfaces will effect an increasing pressure upwards to ring 10 and thus a greater friction contact. It will never be possible that the surfaces pressing against the frusto-conically shaped part will be ajar as 11 and 12 can be adjusted in such a manner as to make 6 adjacent in any case and 10 also resilient and more particularly damping vibrations to such a degree as to prevent any vibrations from occurring. The self-adjustment of the discs 11 and 12 is due to their abutment with the balls 13 and is made possible through the slit which these discs form between themselves. The discs thus always assume such a position that force transmission takes place in a direction normal to the point of contact, in accordance with well-known physical principles. The position is further affected by the force transmission and by the fact that the entire surface of the discs 11 and 12 always abuts against the friction roller, and not only portions of this surface which would cause a spreading apart. The elastic resiliency is made possible by the springs incorporated in the power transmission. Altogether, the following resilient surfaces are provided: the driven or follower rings 10, any springs incorporated in the system (see FIG. 7), and elastic surfaces which support the right sides of the discs 11 and 12, as viewed in FIG. 1.

FIG. 7 shows the other form wherein the surface adjacent to the driving shaft and designated as a driving head may be subdivided. Said two surfaces are designated in FIG. 7 with 27, 28, whereby said surfaces may be displaced against one another under the action of the load or due to a deformation or because of an inaccuracy of the tolerance by means of an interposed spring 29. The FIGS. 3 and 4 illustrate the manner of fixing the follower rings 10 formed as ring springs, said fixing being accomplished either by pins 30 engaging in bores of the adjusting bell 31 or also by shrinking as illustrated in FIG. 4. Slots 33 serve to reduce the weight and consequently the moment of inertia and thus ensure an easy assembly.

For the speed control in the differential the adjustment of the two driving rings 10 is performed through slots 32 provided in an adjusting bell 31. The pins 30 then are connected with the supporting rings, slots 34 making possible the adjustment in one or the other direction.

Figure 8:
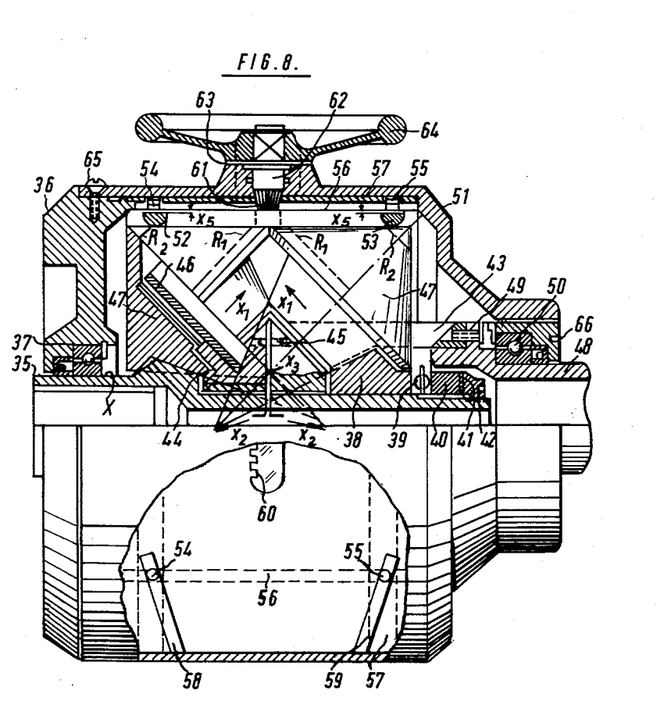
FIG. 8 shows in the upper part a section through the gear and in the lower part a partial section through the casing so as to make visible the adjusting cylinder below.
Figure 8A:
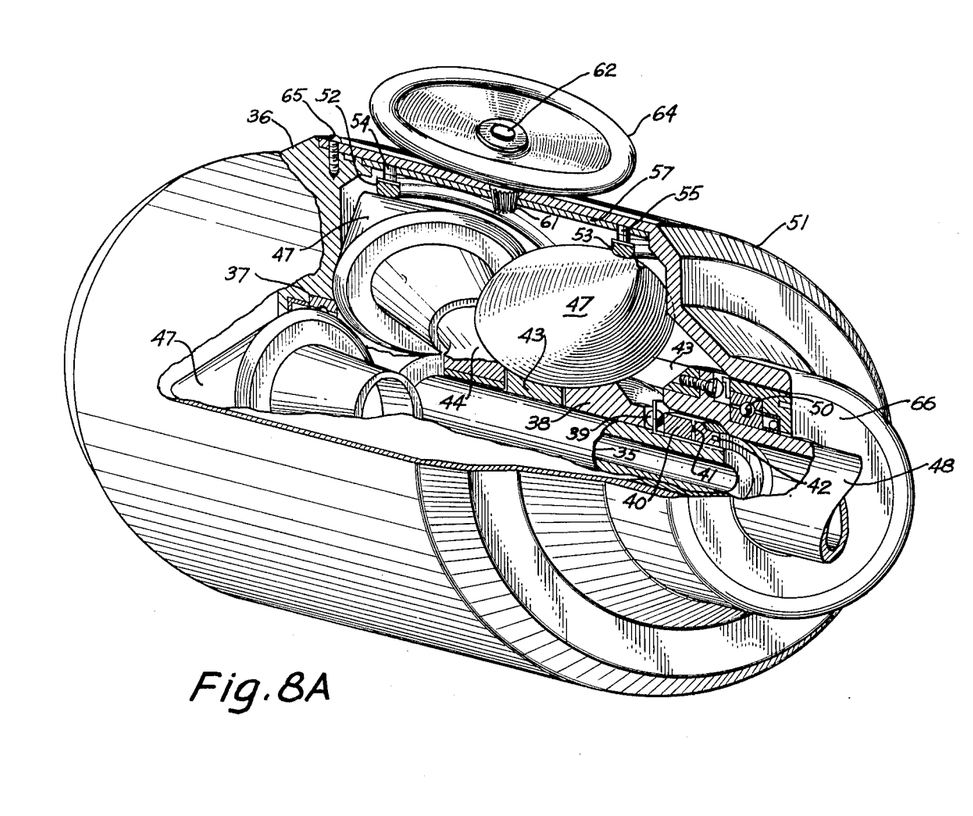
FIG. 8A is an assembly isometric view of the transmission illustrated in FIG. 8 with portions thereof removed to clarify the relationship between the several componoents of the transmission.
Figure 9:
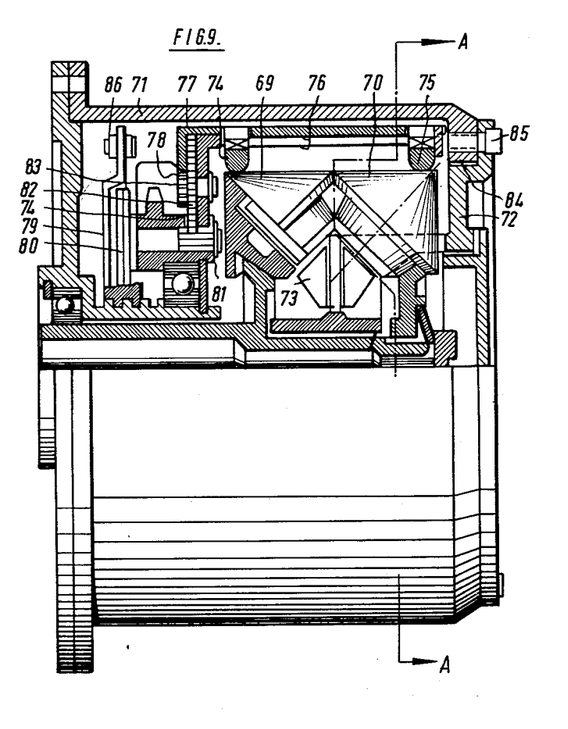
FIG. 9 shows a gear transmission having a stationary roller bearer.
Figure 9A:
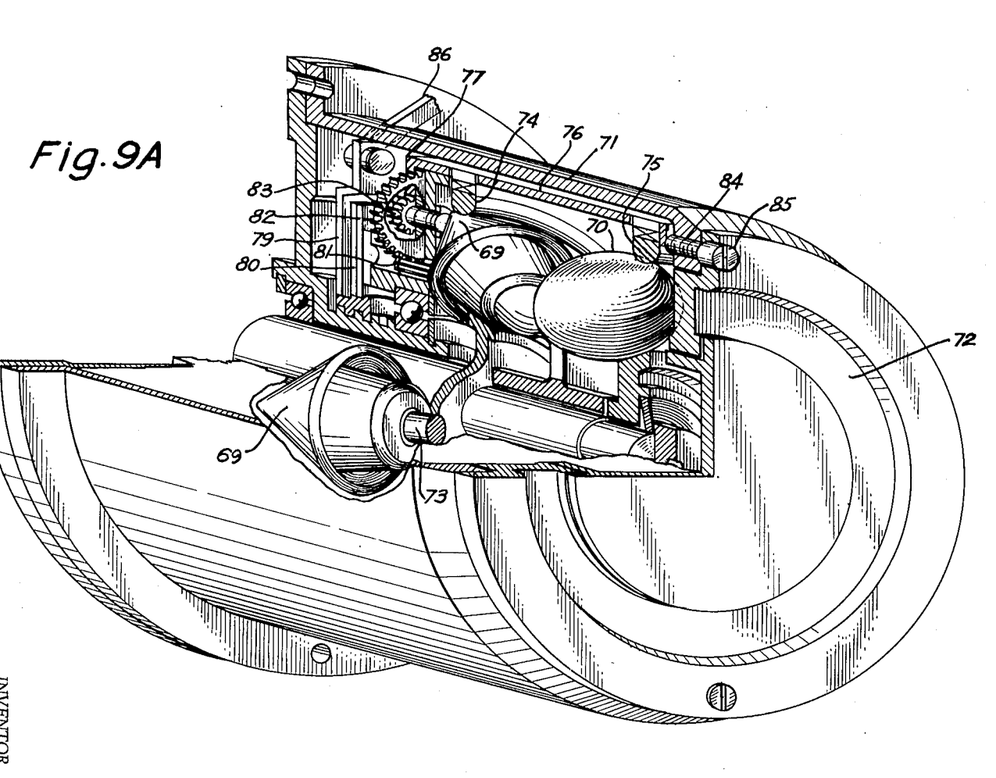
FIG. 9A is an assembly isometric drawing of the stationary roller bearing transmission illustrated in FIG. 9 with portions thereof removed to show the relationship between the several components.
Figure 10:
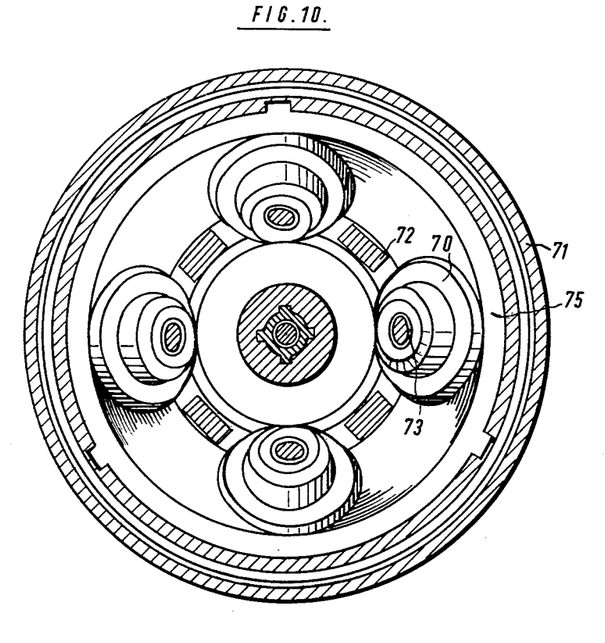
FIG. 10 is a section on the line A—A according to FIG. 9.

As to the embodiment of a bearing being relieved, the following remarks may be added to the FIGURES 8 to 10:

The two axially movable roller bearers 43, 44, carry pins 46 each of which supporting rollers at an inclined axis. When e.g. two roller bearers 43 and 44 exist, the latter are connected by cog pins 45 for receiving the turning moment, said parts thus securely being carried on and mutually supported free from jamming and the reception of the axial wedging action being ensured.

The wedging will become evident as two driving cones inclined to one another are provided on the driving shaft 35, one of the driving cones 38 being axially movable, while a coupling having curved wedging surfaces exists on both sides, carrying balls 39 in a cage so that either the diaphragm spring 41 is subject to an initial tension due to the counter-nut 42 or the part 40 is pressed on to 39 by the introduction of a turning moment, while the part 38 being carried on relatively to the humps is more and more pressed on to the lateral surface of the driving cone with the effect that due to said axial wedging action the conical rollers now are pressed upwards in such a manner as to roll on the supporting rings 52 and 53.

In order to avoid any idle friction, the respective generating lines of the driving cone meet in the center of the driving axle at a distance $x_2$, while the generating tangents of the two supporting cones in the point $x_3$ intersect on the line of intersection of the inclined axes of the two cones outside the center of the axle.

The hollow or solid driving shaft 35 is supported at the casing element 36 by means of bearings 37 so as to be rotatable and axially movable. At the end to the right of the driving axle as viewed in the drawing the opposite driving head 38 is loosely and rotatably mounted and supported by means of a ball ring 39 and a contact ring 40 as well as a diaphragm spring 41 and a counter-nut 42. The parts 38 and 40 carry at their ends load-dependent wedging surfaces to receive balls rolling down. The part 40 is mounted on the driving axle by means of groove and key so as to be secured against rotation while being axially movable. The roller bearer 43 to the right is axially movable with the roller bearer 44 to the left with play indicated by $x_4$ and coupled to it through a cog pin 45. The axles 46 with the conical rollers 47 are put on the two roller bearers so as to be loosely rotatable. The roller bearer 43 is rigidly coupled to the hollow follower shaft 48 by means of flat head screws 49 and supported by bearings 50 in the casing part 51. At the exterior generating surfaces of the two conical roller rows 47 the latter are radially supported by means of the two supporting rings 52, 53, secured against rotation but radially resilient with the play indicated by $x_5$. The two supporting rings carry pins 20, 21, each of which is displaced by 120°, said pins being slidable in axial slots 22 of the casing element 36, open on one side. On the casing cylinder of the element 36 an adjusting cylinder 57 having opposite inclined slots 58, 59, is rotatably mounted, the exterior pins 54, 55, of the parts 52, 53, engaging therein. The lead of every three inclined slots 58, 59, corresponds to the travel from $R_1$ to $R_2$. In the center of the part 57 a gear 60 having the shape of a rack is provided, the length of which also corresponds to the travel of adjustment. The bevel gear 61 engages in said rack with a firm grip, the bevel gear being rotatably supported in the casing element 51 with the shaft 62 and secured against axial displacement by means of the counter-disc 63. On the outside of the square pin of that shaft 62 the hand-wheel 64 is mounted. Both the casing elements 36 and 51 are kept together by the screws 65. The bearing 50 to the right is fixed in the casing element 51 by means of the screw 66 and axially movable.

The mode of operation is as follows:

When the driving shaft 35 is rotated in the direction of the arrow $x$, the two bevel rollers 47 have imparted thereto an initial tension in an axial direction and are driven in the direction of the arrow $x_1$, whereby the bevel rollers roll down mutually supporting themselves, and also roll down on the supporting rings 52, 53, in the same sense with the driving shaft 35. Said rotation is transmitted to the follower shaft 48 through the pivots 46 and the pivot bearer 43, 44. As soon as a turning moment is introduced through the driving shaft 35, the driving head 38 is rotated relative to the ball ring 39 towards the contact ring 40 having curved surfaces formed thereon, so that the two driving heads are axially approached, while the radially load-dependent rollers 47 press against the supporting rings 52 and 53 due to the mutual supporting action in the center. When the supporting rings 52, 53, are axially displaced one relative to the other by rotating respectively the hand wheel 64 and the bevel gear 61, the reduction speed is altered according to the position in the ratio $R_1:R_2=1$, according to the size of the rollers and the difference of the cross-section of the rollers 47.

In order to avoid any jamming of the pivots due to the play of wedging, the two pivot bearers 43, 44, have a mutual axial play $x_4$. In order to adjust equal radii of travel at the supporting rings, the pivot bearer 43, 44. may be adjusted relative to the shaft 35 by the setting nut 66. Likewise the axial initial tension of the driving heads may be adjusted by the counter-nut 42.

FIG. 9 illustrates a gear transmission similar to the above described type with the difference that the rollers 69, 70, are mounted in pairs on to the roller bearer 72 which is stationary in relation to the casing 71. The roller pivots 73 may be radially balanced free from jamming in the play of wedging according to the deformation of the follower rings. The speed reduction takes place through the bell 76 and the adjusting cylinder 77, the speed control being performed through the gear 78 during the rotation in such a manner that with the regulating disc 79 being adjacent to the inner friction gear 80 through the gears 81, 82, 83, supported in the bell 76 the two follower rings 74, 75, are approached, while with the regulating disc 79 being adjacent exteriorly, the two rings 74, 75, are adjusted outwardly. From the regulating disc 79 outwardly an adjusting rod 86 extends through the casing 71 outwardly. The axial adjustment for equal course of the radii takes place through the thread 84 of the roller bearer during the assembly. After the adjustment the bore is closed by means of the screws 85.

In FIG. 10 the corresponding reference characters refer to corresponding parts. It is also possible to exchange the driving side for the driven side without any prejudice to the mode of operation. Likewise the roller bearer may be attached to the casing and the speed reduction may take place through the exterior follower rings 52, 53, causing the latter to rotate, the speed control thus being performed centrally. In order to obtain a speed step-up transmission the two follower rings 52, 53, may serve as drivers, whereby either the pivot bearer serves as a follower and the parts 35 and 39 are stationary with the casing or inversely the pivot bearer is stationary and the driving shaft 35 to 39 serves as a follower or driven part.

The range of application of the present invention extends to all types of friction roller gear transmissions wherein an automatic regulation is to be achieved and an easy adjustment is to be made possible, while any vibrations resulting from occurring deformations, contact variations and manufacture tolerances can be avoided.

The novel gear transmission provides a great linear range of control and an operation entirely free of stress due to the characteristic of wedging, a high efficiency as well as a load-dependent proportional tensile power so that considerable economical advantages result.

The load coupling may be unilateral as well as bilateral, whereby respectively both driving heads and driving cones are loosely put on the driving shaft.

I claim:

1. In a friction roller gear transmission, a rotating driving head, a supporting disk spaced from said driving head, rotating conical rollers wedged between said driving head and said supporting disk, said conical rollers comprising an upper conical part and a lower frusto-conical part, said supporting disk having a load dependent curved surface coupling, a follower ring engageable with said upper conical part and spaced from said curved surface coupling on said supporting disk, said supporting disk having self-adjusting supporting surfaces engaging said conical parts so that the driving head and the coupling are positioned uniformly adjacent to the wedging surfaces of said conical rollers.

2. A friction roller gear transmission, as claimed in claim 1, and further comprising a casing, said self-adjusting supporting surfaces comprising independently movable supporting disks, a second supporting disk adjacent to said casing, and a plurality of ball bearings between said movable supporting disks and said second supporting disk.

3. A friction roller gear transmission, as claimed in claim 2, and further comprising a handwheel, and means interconnecting said hand-wheel and said second supporting disk so as to produce the variable contact pressure of the supporting disks upon the conical parts.

4. A friction roller gear transmission, as claimed in claim 2, and comprising a cage for retaining said ball bearings therein between the curved surfaces of the supporting disks and said second supporting disk, and means operable exteriorly of said casing for displacing said ball bearings independently of the load and relatively to the curved surfaces.

5. A friction roller gear transmission, as claimed in claim 4, with there being a bore in said roller bearing cage, a pin received within said bore, and an eccentric for displacing said cage in a direction relatively to said curved surface to actuate said pin.

6. A friction roller gear transmission, as claimed in claim 5, and comprising a spring, a pin, said spring and pin connecting said eccentric to said casing in such a manner so that said ball bearing cage will always occupy the same position relative to the curved surfaces in the rest position of the gear transmission.

7. A friction roller gear transmission, as claimed in claim 2, wherein the driving head surface adjacent to the wedging surface of the conical rollers comprises a first fixed part and a second adapting part, there being a spring for moving said adapting part axially of said transmission.

8. A friction roller gear transmission according to claim 2, wherein the races of the supporting discs are formed as two friction paths travelling at a different level at the truncated cone, with a hollow space therebetween, thereby permitting an independent adjustment.

9. A friction roller gear transmission according to claim 2, wherein the follower ring is formed as a ring spring for damping vibrations.

10. A friction roller gear transmission, as claimed in claim 9, and comprising a slotted driven bell member, and pins connecting said ring spring to said bell member.

11. A friction roller gear transmission, as claimed in claim 1, and comprising a double row gear transmission, the surface of the conical roller opposing said coupling being flexible.

12. A friction roller gear transmission according to claim 1, wherein mutually wedging driving cone surfaces are arranged on a driving shaft, of which the driving cone surface arranged towards the driven side is axially movable by means of a load-dependent curved surface coupling.

13. A bevel roller friction gear transmission according to claim 12, wherein the bevel roller journals running in parallel are axially movable towards one another with play, and wherein pins are provided that engage in bores for being mutually carried on the driven head.

14. A bevel roller friction gear transmission according to claim 12, wherein the bevel rollers arranged in parallel are so adjusted that the generating tangents of the cone surfaces at supporting rings intersect on the line of intersection of the two inclined cone axes outside the center line of the driving shaft, whereas the driving cone generating lines meet at a distance on the center line of the driving shaft.

15. A bevel roller friction gear transmission according to claim 12, wherein a diaphragm spring imparts an initial tension to the load-dependent coupling through a counter-nut and that the roller bearer is adjustable to an equal travel of the radii by the counter-nut through the bearing.

16. A bevel roller friction gear transmission according to claim 12, wherein an adjusting cylinder rotatable through a gear has opposing inclined slots for moving the pins at the radially resilient supporting rings in the slot to each other or apart.

References Cited in the file of this patent
UNITED STATES PATENTS

| | | |
|---|---|---|
| 2,444,470 | Richardson | July 6, 1948 |
| 2,570,493 | Schmidt | Oct. 9, 1951 |
| 2,697,359 | Louis | Dec. 21, 1954 |